United States Patent [19]
Bryant

[11] Patent Number: 4,806,050
[45] Date of Patent: Feb. 21, 1989

[54] EDGE ROUTING CUTTER

[76] Inventor: Kenneth W. Bryant, Rte. 4, Box 409F, Farmington, Mo. 63640

[21] Appl. No.: 125,889

[22] Filed: Nov. 27, 1987

[51] Int. Cl.$^4$ ............................................. B23B 51/00
[52] U.S. Cl. ................................ 408/203.5; 408/207; 407/58; 407/60
[58] Field of Search ................... 407/1, 2, 7, 8, 9, 10, 407/56, 58, 59, 60, 61, 62, 63, 14, 30, 33, 46, 47, 51, 52; 408/203.5, 204, 205, 207, 208

[56] References Cited

U.S. PATENT DOCUMENTS

| | | | |
|---|---|---|---|
| 298,908 | 5/1884 | Stanger | 408/208 |
| 1,046,747 | 12/1912 | Eager | 408/203.5 |
| 1,713,273 | 5/1929 | Farrington | 407/61 |
| 2,126,476 | 8/1938 | Koonz | 408/203.5 |
| 2,680,898 | 6/1954 | Diosi | 407/59 |

Primary Examiner—Frederick R. Schmidt
Assistant Examiner—Blynn Shideler
Attorney, Agent, or Firm—James H. Grover

[57] ABSTRACT

A rotary router bit for smoothing the edges of a sheet of abrasive or easily splintered material has two collars axially spaced on the router shank. Each collar has peripheral cutting teeth overlapping opposed teeth of the other collar and inclined at a shearing angle with respect to the axis of the shaft. The teeth extend oppositely toward each other and are formed around a central open space between the teeth and the shank into which chips from the sheet are fed so as not to clog the cutting edge of the teeth but so as to allow for subsequent ejection from the bit.

13 Claims, 1 Drawing Sheet

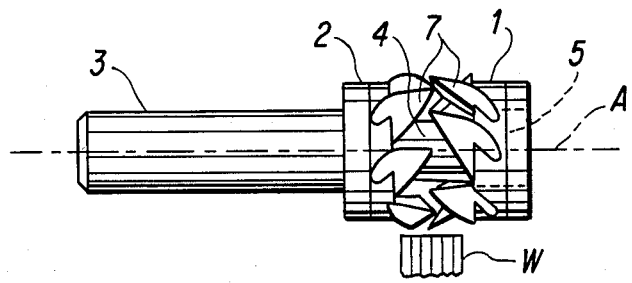
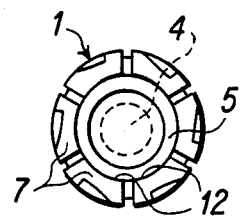
FIG. 1  FIG. 2
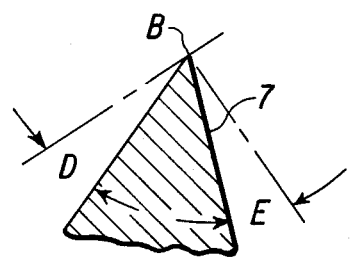
FIG. 5
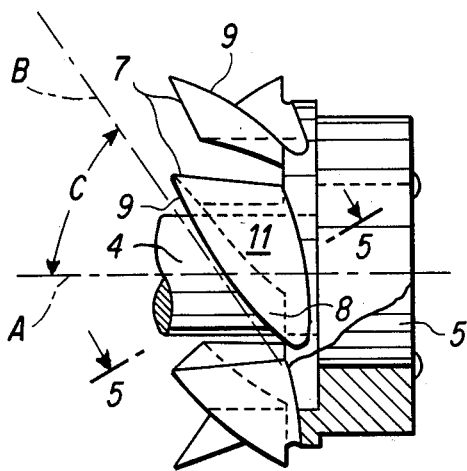
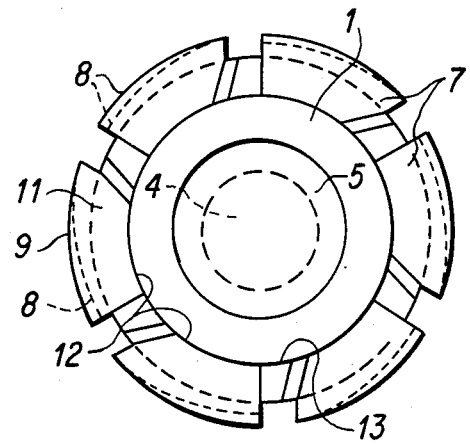
FIG. 3  FIG. 4

EDGE ROUTING CUTTER

BACKGROUND OF THE INVENTION

In the manufacture of aircraft wings from laminated sheet material it is necessary, after cutting the outline of the wing, to smooth the rough, cut edge of the sheet with a router bit or like cutting tool. The wings of current military aircraft are, however, made of a graphite-epoxy composite, with or without aluminum or titanium backup, which is so extremely abrasive that ordinary metal cutting tools are dulled by the composite too quickly to be employed economically. Moreover, the composite would be subject to delamination and splintering if its edges were smoothed with tungsten carbide or polycrystalline diamond routers of conventional design. Similarly, less abrasive materials such as plywood are splintered and delaminated when their edges are trimmed with routers of conventional metals such as tool steel, for example.

It is therefor the object of the present invention to provide an edge routing cutting tool of novel construction which smooths the edges of sheets without splintering or delaminating them.

SUMMARY OF THE INVENTION

According to the invention a rotary cutting tool for routing the edge of a workpiece comprises a cylindrical shank with a longitudinal axis, and two cylindrical collars on the shaft having peripheral cutting teeth; wherein each has a base portion forming the teeth around a central open space between the teeth and the shank, so that the teeth cut chips from the workpiece centrally of the edge and the two collars in two directions axially toward and into the open space. Further the teeth extend axially to a cylindrical shearing edge concentric with the collars and inclined at angle between thirty and seventy degrees to the axis of the shank. Additionally the teeth on the collars may extend oppositely toward each other in mirror image, are staggered peripherally and overlap axially.

DRAWINGS

FIG. 1 is a side elevation of a router tool with two toothed collars according to the invention;

FIG. 2 is an end elevation of the tool of FIG. 1;

FIG. 3 is an enlarged side elevation, partly broken away, of one of the collars of FIG. 1;

FIG. 4 is an end view of the collar of FIG. 3; and

FIG. 5 is a section on line 5—5 of FIG. 3.

DESCRIPTION

As shown in FIGS. 1 and 2 a router tool has two opposed, toothed collars 1 and 2 fixed on a long cylindrical shank on an axis A which has a middle portion of reduced diameter and a short end portion 5 of the same diameter as the opposite end. Each of the first and second collars 1 and 2 has six teeth 7, more or less, extending centrally toward the teeth of the opposite collar. Each collar is a mirror image of the opposite collar with the teeth on one collar overlapping those of the other and staggered angularly about the shaft axis relative to those on the other collar.

The first collar 1 is shown enlarged in FIGS. 3 and 4 secured to the end portion 5 of the shank 3. Each of its teeth 7 has an outer conical surface 8 which is concentric with the shaft axis A and extends at an angle D (FIG. 5) to a shearing edge 9. The shearing edge is formed along a tangent B at the intersection of the conical surface 8 and a flat face 11 inclined at angle E from the shearing edge 9 axially inwardly to the shank axis A. The angle D of the conical surface and the angle E of the flat are approximately 20 degrees so that the shearing edge has an include angle of about fifty degrees. The inclination of the angle C between the tangent B to the shearing edge 9 and the shank axis A is between thirty and seventy degrees, preferably about fifty five degrees.

The inside cylindrical surface 12 of the teeth 17 on the tubular portions 2 and 5 of the collars is greater in diameter than the shank 3 and its reduced diameter portion 4 so that an central open space 13 is provided inside the teeth, between the teeth and the shank. Because each tooth, by virtue of its large shearing angle C, slices rather than scrapes the edge of a workpiece, and because of the radially inward inclination of the inner flat face 11, each cutting edge 9 directs chips sheared from the edge of the workpiece inwardly into the open space around the router shank, rather than outwardly back at the workpiece, and also dissipates heat by flow of chips and air into and out of the open space. Further, because the the opposed shearing edges of the opposite collars shear axially toward each other they will rout from the outside surface of sheet material toward the center of the edge of the sheet rather than along the edge. Consequently splintering of the edges is avoided. By reason of the opposed, centrally directed shearing action, the opposed cutting forces neutralize each other rather than tending to flex the workpiece or delaminate it by outward pressure toward either surface of the sheet. The overlap of opposed teeth halfway between the collars removes any tendency of splinters to remain centrally of the workpiece edge.

The routing tool described is particularly useful for cutting the edge of the extremely abrasive sheets of graphite-epoxy composite material used in military aircraft wings because it may be formed of materials substantially harder than tool steel, for example tungsten carbide and polycrystalline diamond. These hard cutting materials may be formed in the shapes of the collars shown by sintering. The collars may then be brazed to the shank. The shank is preferably of a material having the same coefficient of expansion as the collars, tungsten carbide being an example.

It should be understood that the present disclosure is for the purpose of illustration only, and that the invention includes all modifications and equivalents within the scope of the appended claims.

I claim:

1. A rotary cutting tool for routing the edge of a workpiece comprising:
   a cylindrical shank with a longitudinal axis; and
   two cylindrical collars on the shank having peripheral cutting teeth; wherein
   each collar has a base portion extending to the shank and a tubular portion forming a series of spaced, discrete teeth extending axially beyond said base portion and extending over and around a central open space between the teeth and the shank, the teeth on respective collars extending oppositely toward each other;
   whereby the teeth slice chips from the edge of the workpiece centrally of the edge and the collars in two, opposite directions toward and into the open space.

2. A tool according to claim 1 wherein each tooth on a collar extends axially toward the teeth of the other collar to a shearing edge concentric with the collar.

3. A tool according to claim 2 wherein each tooth is further formed by an intersecting surface inclined radially inwardly of the cylindrical collar.

4. A tool according to claim 3 wherein the intersecting surface is inclined at an angle between thirty and seventy degrees to the axis of the shank.

5. A tool according to claim 3 wherein the angle of the shearing edges is approximately fifty five degrees.

6. A tool according to claim 2 wherein the teeth on opposed collars are staggered circumferentially.

7. A tool according to claim 1 wherein the teeth are arrayed on the collars in mirror image.

8. A tool according to claim 1 wherein the teeth on opposed collars are staggered circumferentially.

9. A tool according to claim 1 wherein the shank is formed of a material the same as that of the collars.

10. A tool according to claim 1 wherein the collars and teeth are formed integrally of a cutting material harder than tool steel.

11. A tool according to claim 10 wherein the material is selected from the group consisting of tungsten carbide and polycrystalline diamond.

12. A tool according to claim 11 wherein the shank is formed of the same material as the collars.

13. A tool according to claim 1 wherein the teeth of one collar axially overlap the teeth of the other collar.

* * * * *